United States Patent
Cook et al.

(10) Patent No.: US 7,680,741 B2
(45) Date of Patent: Mar. 16, 2010

(54) METHOD AND APPARATUS FOR USING RETAIL AUTHORIZATION TO REDUCE THE INITIAL VALUE OF A SOFTWARE PRODUCT

(75) Inventors: Richard W. Cook, Tucson, AZ (US); Timothy A. Rosemore, Reno, NV (US); Andrew A. Woods, Mountain View, CA (US); Jennifer Possin, San Francisco, CA (US); Edmund Y. L. Sung, Millbrae, CA (US)

(73) Assignee: Intuit Inc., Mountain View, CA (US)

( * ) Notice: Subject to any disclaimer, the term of this patent is extended or adjusted under 35 U.S.C. 154(b) by 157 days.

(21) Appl. No.: 11/828,818

(22) Filed: Jul. 26, 2007

(65) Prior Publication Data
US 2008/0046376 A1 Feb. 21, 2008

Related U.S. Application Data

(63) Continuation-in-part of application No. 11/476,990, filed on Jun. 27, 2006.

(51) Int. Cl.
*G06F 17/60* (2006.01)
(52) U.S. Cl. .......................................... 705/52; 705/51
(58) Field of Classification Search ................... 705/52, 705/51
See application file for complete search history.

(56) References Cited

U.S. PATENT DOCUMENTS

| | | | |
|---|---|---|---|
| 5,398,285 A | | 3/1995 | Borgelt |
| 5,956,505 A | * | 9/1999 | Manduley ........................ 713/1 |
| 6,169,976 B1 | | 1/2001 | Colosso |
| 6,442,559 B1 | | 8/2002 | Martinsen |
| 2003/0004889 A1 | | 1/2003 | Fiala |
| 2003/0105672 A1 | * | 6/2003 | Epstein et al. ................. 705/26 |
| 2003/0163804 A1 | * | 8/2003 | Burke et al. ................. 717/170 |
| 2004/0044901 A1 | | 3/2004 | Serkowski |
| 2005/0004838 A1 | * | 1/2005 | Perkowski et al. ............. 705/14 |
| 2005/0278216 A1 | * | 12/2005 | Graves ........................ 705/14 |
| 2006/0258397 A1 | * | 11/2006 | Kaplan et al. ............. 455/556.1 |

FOREIGN PATENT DOCUMENTS

| | | |
|---|---|---|
| EP | 1748375 A1 | 7/2006 |
| EP | 1705610 A1 | 9/2006 |
| GB | 2439626 A | 5/2007 |
| JP | 2002197220 A * | 7/2002 |

* cited by examiner

*Primary Examiner*—Pierre E Elisca
(74) *Attorney, Agent, or Firm*—Park, Vaughan & Fleming LLP; Mark Spiller

(57) ABSTRACT

One embodiment of the present invention provides a system for using retail authorization to reduce the initial value of a software product. During operation, the system receives an initial bill for an un-activated version of the software product. Because this un-activated version is not fully functional, it has a lower value than a functional version of the software product, and hence the initial bill charges for a lower initial cost. During the sale of an un-activated version of the software product, the system activates the un-activated version from a point of sale system. After the sale, the system receives an additional bill for activating the software product.

25 Claims, 7 Drawing Sheets

METHOD AND APPARATUS FOR USING RETAIL AUTHORIZATION TO REDUCE THE INITIAL VALUE OF A SOFTWARE PRODUCT

RELATED APPLICATION

This application is a continuation-in-part of pending application Ser. No. 11/476,990 filed on 27 Jun. 2006 by inventors Edmund Y. L. Sung, Timothy A. Rosemore, Jennifer Possin, Raymond S. Tenenbaum, and Stephen L. Molloy, entitled, "Method and Apparatus for Authorizing a Software Product to be Used on a Computer System". This application hereby claims priority under 35 U.S.C. §120 to the above-listed parent patent application.

BACKGROUND

To avoid losing revenue due to theft of software products, retailers typically implement theft-deterrent measures for software products. Often, these theft-deterrent measures interfere with the shopping experience of legitimate customers because the theft deterrent measures make it more difficult for a prospective buyer to select a software product. For example, some retailers currently use is "spiderwrap" to protect software products, wherein the spiderwrap comprises a set of wires which are wrapped around a box containing a software product and are locked together. Unfortunately, spiderwrap often obscures the description written on the box of the software product. Furthermore, spiderwrap prevents a customer from opening a product "description flap," which is included with many software products. As a consequence, spiderwrap makes it difficult for the customer to select and purchase a software product.

Some retailers place software products that exceed a certain price in a locked case or in a storage room, thereby making it not only difficult to view a product description, but also increasing the amount of time required to select and purchase the software product. Note that some retailers may leave an empty box (or an acrylic box) in a location accessible by a customer to facilitate the customer's decision to purchase a software product. However, while this empty box may provide some additional descriptive benefit, the customer typically will still need to take additional effort to find an available sales person to retrieve the actual software product.

The above-described theft-deterrent measures make it more difficult for a customer to purchase a product. As a result, these theft-deterrent measures can often cause the retailer to lose revenue.

SUMMARY

One embodiment of the present invention provides a system for using retail authorization to reduce the initial value of a software product. During operation, the system receives an initial bill for an un-activated version of the software product. Because this un-activated version is not fully functional, it has a lower value than a functional version of the software product, and hence the initial bill charges for a lower initial cost. During the sale of an un-activated version of the software product, the system activates the un-activated version from a point of sale system. After the sale, the system receives an additional bill for activating the software product.

Another embodiment of the present invention provides a system for enabling retail authorization to reduce the initial value of a software product. During operation, the system sends a retailer an initial bill for an un-activated version of the software product. Because this un-activated version is not fully functional, it has a lower value than a functional version of the software product, and hence the initial bill charges for a lower initial cost. During the sale of an un-activated version of the software product, the system receives a request from a point of sale system to activate the un-activated version of the software product. In response to this request, the system activates the un-activated version, and then sends the retailer an additional bill for activating the software product.

In some embodiments of the present invention, the lower value and associated lower initial cost (or "sell-in cost") for the un-activated version of the software product reduces retailer inventory costs and the likelihood of theft for the software product.

In some embodiments of the present invention, the un-activated version of the software product is displayed at the retail location.

In some embodiments of the present invention, the system determines an initial cost for the un-activated software product which encourages the retailer to stock and display the un-activated version while giving the retailer an incentive not to lose the un-activated version.

In some embodiments of the present invention, the initial cost corresponds to a material cost for the software product.

In some embodiments of the present invention, the additional bill charges for the difference between the wholesale cost and the initial cost for the software product.

In some embodiments of the present invention, the initial cost is zero and the additional bill is for the full wholesale cost of the software product.

In some embodiments of the present invention, the initial cost and/or the additional bill include a set-up fee and/or an ongoing maintenance fee relating to the software product and/or the retail authorization system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Figure 1:
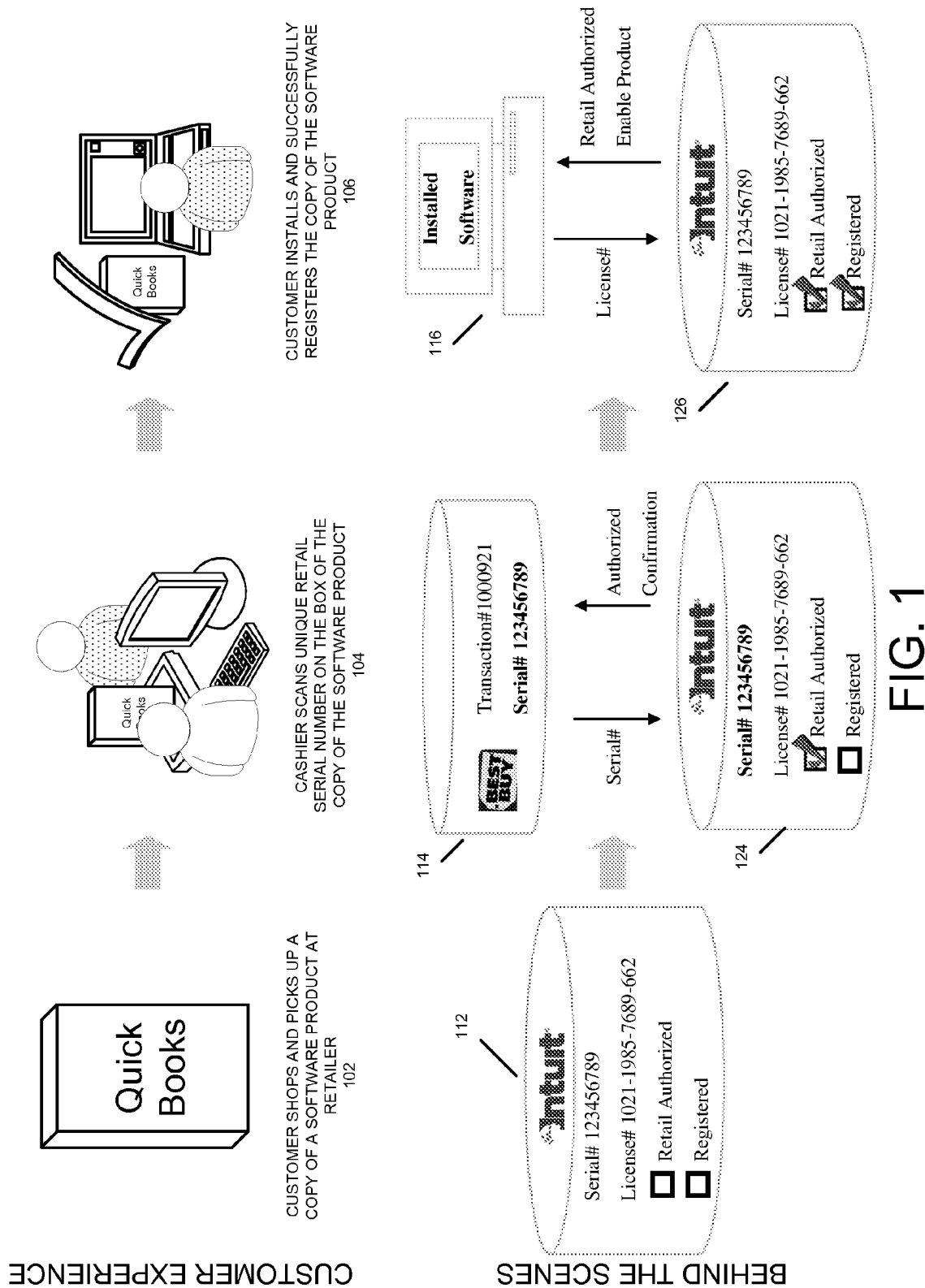
FIG. 1 illustrates the process of purchasing and installing a software product in accordance with an embodiment of the present invention.

One embodiment of the present invention teaches a method for deterring theft by authorizing the use of a software product at a point of sale system. FIG. 1 illustrates the process of purchasing and installing a software product in accordance with an embodiment of the present invention. Note that a software product can refer to a license for software already existing on a computer system, or a license and a disk to be installed on a computer system. In this embodiment, a customer selects a software product to purchase at a retailer, and takes the software product to a cashier to complete the purchase (step 102). Note that the customer can purchase a single license, a volume license, a consumptive or transaction-based license, or a site license for the software product. Furthermore, note that a customer can be an individual, or an organization. At this point, an authorization agent has neither authorized nor registered the copy of the software product (see 112). Note that an authorization agent can include a retail-store manager or owner, the original equipment manufacturer of the software product, or a third-party organization responsible for authorizing the software product. Furthermore, the authorization agent can be an individual or group of individuals, or a mechanism responsible for authorizing the software product.

In one embodiment of the present invention, the authorization agent ensures that a customer can only use a copy of the software product that the customer legally purchased. In this embodiment, the authorization agent includes a database entry for each copy of the software product for sale at the retailer.

Next, the cashier scans a unique serial number on the copy of the software product at a point of sale system (step 104). Scanning the unique serial number results in the retailer sending the unique serial number to the authorization agent (see 114). Then, the authorization agent records the fact that the retailer has authorized the copy of the software product for use, and sends an authorization confirmation to the retailer (see 124). Finally, the customer installs the copy of the software product on a computer system and registers the copy of the software product with the authorization agent (step 106). Installing the copy of the software product involves the computer system sending a license number associated with the copy of the software product to the authorization agent (see 116). The authorization agent then records the fact that the copy of the software product is registered, and also enables the full purchased functionality of the copy of the software product on the computer system (see 126). Note that the customer can install the copy of the software product on a plurality of computer systems, a server, or a plurality of servers. Also, note that registering the copy of the software product can include: verifying the identity of the customer; verifying the customer's authorization to use the copy of the software product; verifying the customer's authorization to install the copy of the software product; and providing customer contact and feedback information. In one embodiment of the present invention, registering the copy of the software product and verifying the customer's authorization to install and/or use the copy of the software product are separate and independent processes. In one embodiment of the present invention, registering the copy of the software product and verifying the customer's authorization to install and/or use the copy of the software product are part of the same process.

Figure 2:
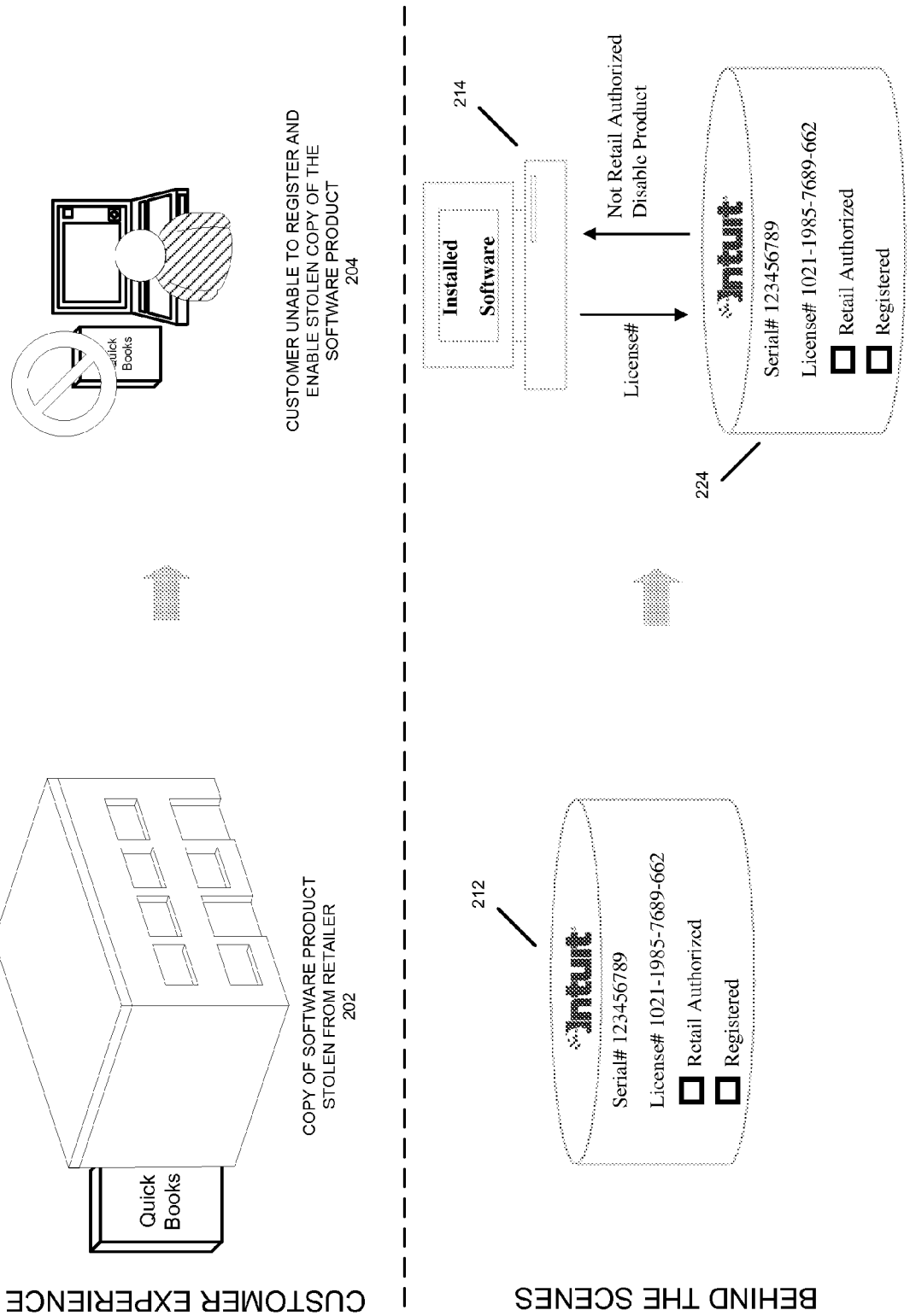
FIG. 2 illustrates the process of stealing and attempting to install a software product in accordance with an embodiment of the present invention.

FIG. 2 illustrates a process of stealing and attempting to install a software product in accordance with an embodiment of the present invention. In this embodiment, a thief steals a copy of the software product from a retailer (step 202). At this point, the authorization agent has neither authorized nor registered the copy of the software product (see 212). When the thief installs the stolen copy of the software product on a computer system, the computer system sends a license number associated with the stolen copy of the software product to the authorization agent (see 214). The authorization agent determines that the stolen copy of the software product is not authorized by the retailer and the authorization agent disables the functionality of the stolen copy of the software product on the computer system (see 224). Thus, the thief is unable to enable the functionality of the stolen copy of the software product (step 204).

Computing Environment

Figure 3:
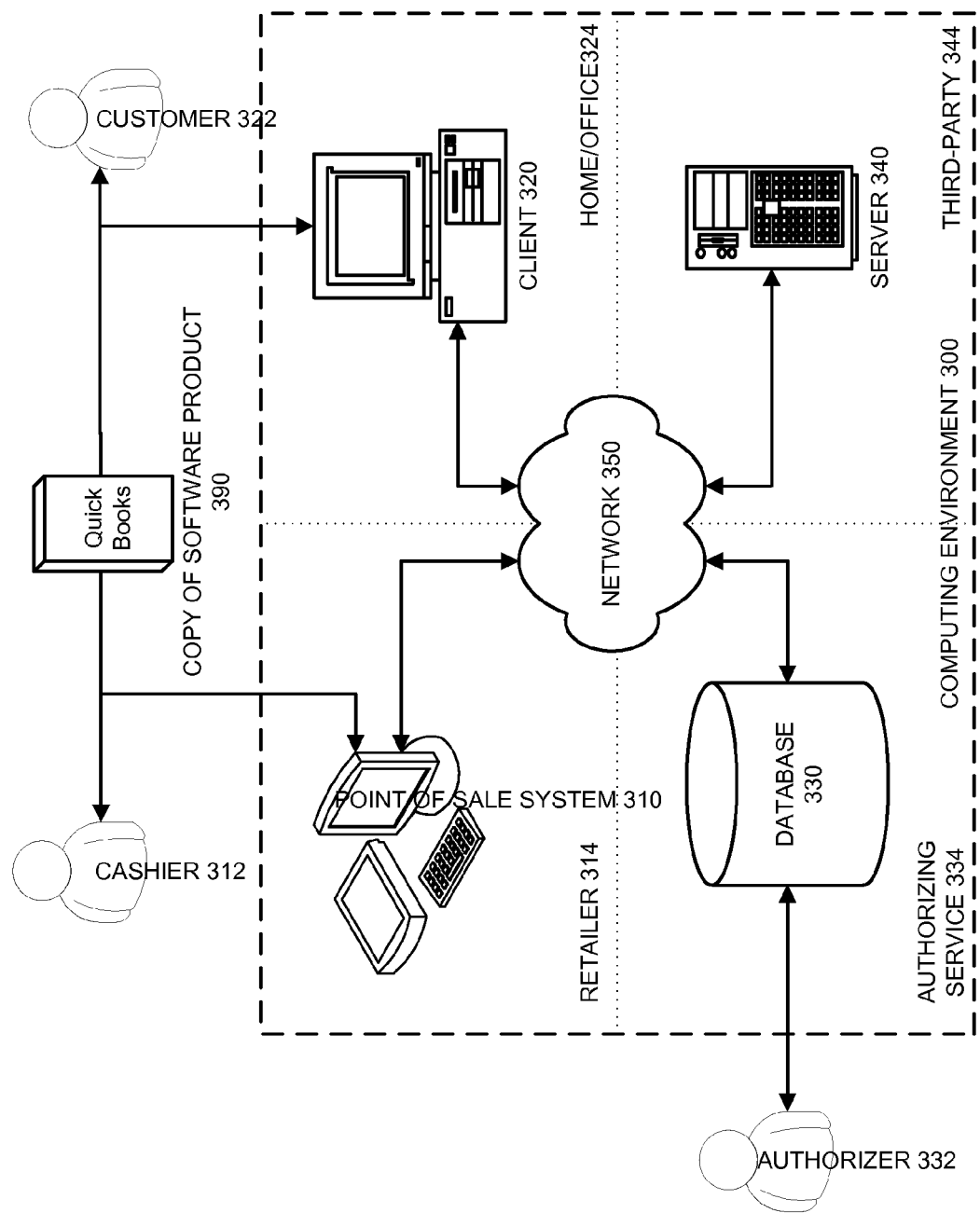
FIG. 3 illustrates a computing environment in accordance with an embodiment of the present invention.

FIG. 3 illustrates a computing environment 300 in accordance with an embodiment of the present invention. Computing environment 300 can generally include any type of computer system, including, but not limited to, a computer system based on a microprocessor, a mainframe computer, a digital signal processor, a portable computing device, a personal organizer, a device controller, and a computational engine within an appliance. Computing environment 300 includes point of sale system 310, client 320, database 330, server 340, and network 350.

In one embodiment of the present invention, computing environment 300 is divided (as illustrated by the dotted lines) into four sub-environments representing different organizations/physical locations. These sub-environments include: retailer 314 which sells the software product to customers; home/office 324 where the customer installs and uses the software product; authorizing service 334, which ensures that the copy of the software product was legally purchased prior to enabling full functionality of the software product; and third-party 344, which may perform data collection and processing to assist authorizing service 334, retailer 314, or the manufacturer of copy of software product 390.

In one embodiment of the present invention, authorizing service 334 can be the original equipment manufacturer of the copy of software product 390, or retailer 314.

In one embodiment of the present invention, home/office 324 is retailer 314.

In one embodiment of the present invention, retailer 314 is the original equipment manufacturer of the copy of software product 390.

In one embodiment of the present invention third-party 344 can be the original equipment manufacturer of the copy of software product 390, retailer 314, or authorizing service 334.

In one embodiment of the present invention, retailer 314 can be an online retailer. In this embodiment, customer 322 can download copy of software product 390 or a license for the copy of software product 390 from retailer 314's web-site or an associated web-site, or visit a brick-and-mortar store associated with retailer 314 to obtain the copy of software product 390 or a license for the copy of software product 390.

Point of sale system 310 can generally include any device capable of making and recording a purchase transaction. Typically, point of sale system 310 includes a device for scanning barcodes and a device for reading magnetic stripes, such as those found on credit cards. Point of sale system 310 can also include a device for reading radio frequency identification (RFID) tags.

Client 320 can generally include any node on a network including computational capability and including a mechanism for communicating across the network.

Database 330 can generally include any type of system for storing data. This includes, but is not limited to, systems based upon magnetic, optical, and magneto-optical storage devices, storage devices based on flash memory and/or battery-backed up memory, or other systems capable of storing computer readable data now know or later developed.

Server 340 can generally include any computational node including a mechanism for servicing requests from a client for computational and/or data storage resources.

Network 350 can generally include any type of wired or wireless communication channel capable of coupling together computing nodes. This includes, but is not limited to, a local area network, a wide area network, or a combination of networks. In one embodiment of the present invention, network 350 includes the Internet.

In one embodiment of the present invention, customer 322 decides to purchase copy of software product 390. Customer 322 takes a copy of software product 390 to cashier 312 who subsequently scans a barcode associated with the copy of software product 390 at point of sale system 310. Next, point of sale system 310 sends authorization information to database 330 via network 350 at authorizing service 334. Then, database 330 locates the database entry associated with the copy of software product 390 and records that copy of software product 390 is retail-authorized. Next, customer 322 installs the copy of software product 390 on client 320 at home/office 324. This involves client 320 contacting database 330 via network 350 and sending registration information to database 330. Database 330 uses the registration information to identify the database entry associated with the copy of software product 390 and then registers the copy of software product 390. Database 330 then enables the full functionality of the copy of software product 390 at client 320.

In one embodiment of the present invention, the authorization information can include information obtained by scanning a barcode on the box of the copy of software product 390 such as a unique serial number associated with the copy of software product 390, and a version identifier that identifies the version of computer software that customer 322 is purchasing. In addition to the information obtained by scanning the barcode on the box of the copy of software product 390, the authorization information can include: retailer 314's name; retailer 314's location identifier; the sale price, wherein the sale price is the price paid by customer 322 the for copy of software product 390; the purchase price, wherein the purchase price is the price retailer 314 paid for the copy of software product 390; customer 322's name; and customer 322's contact information.

In one embodiment of the present invention, registration information can include a serial number, a license number, retailer 314's name, customer 322's name, and customer 322's contact information.

In one embodiment of the present invention, verification information can include a serial number, a license number, retailer 314's name, customer 322's name, and customer 322's contact information.

In one embodiment of the present invention, point of sale system 310 sends the authorization information to server 340 via network 350 to perform any additional processing, such as information tracking, requested by the original equipment manufacturer (not shown), retailer 314, or authorizing service 334. The additional processing can include generating a bill for the difference between the initial purchase price (the price retailer 314 paid to obtain the copy of software product 390) and the actual purchase price (the price retailer 314 agreed to pay for the copy of software product 390). Note that the initial purchase price can be zero.

In one embodiment of the present invention, server 340 belonging to third-party 344 sends the authorization information to database 330 at authorizing service 334.

In one embodiment of the present invention, cashier 312 contacts authorizer 332 via network 350, a telephone (not shown), or any other communication method known to those familiar in the art capable of providing the authorization information to authorizer 332. Authorizer 332 then modifies an entry associated with copy of software product 390 to indicate that copy of software product 390 is retail-authorized. Note that authorizer 332 can include: a computer system that is coupled to database 330, a module within database 330, a person that has access to database 330, or a device that has access to database 330.

In one embodiment of the present invention, customer 322 contacts authorizer 332 via network 350, a telephone (not shown), or any other communication method known to those familiar in the art and provides the registration information to authorizer 332. Authorizer 332 uses the registration information to identify the database entry on database 330 associated with the copy of software product 390 and then registers the copy of software product 390. Authorizer 332 then enables the full functionality of the copy of software product 390 at client 320 by providing a license number or an authorization-key to customer 322, sending the authorization key to client 320 via a client (not shown) at authorizing service 334, or modifying an entry on database 330 associated with copy of software product 390 to indicate that copy of software product 390 is authorized for use by customer 322, client 320, or home/office 324.

In one embodiment of the present invention, retailer 314 provides the license number or authorization-key to customer 322.

In one embodiment of the present invention, copy of software product 390 is a web-based application. In this embodiment, customer 322 purchases a license from retailer 314 to download and install copy of software product 390 on client 324, or to access and use copy of software product 390 on a server, such as server 340. In this embodiment, retailer 314 can provide the license to customer 322 as a license number, an authorization-key, a dongle, a read-only storage medium, a device that can be coupled to a client that includes a license or a license certificate, or any other method for providing the license to customer 322 known to those familiar in the art.

Purchasing a Software Product

Figure 4:
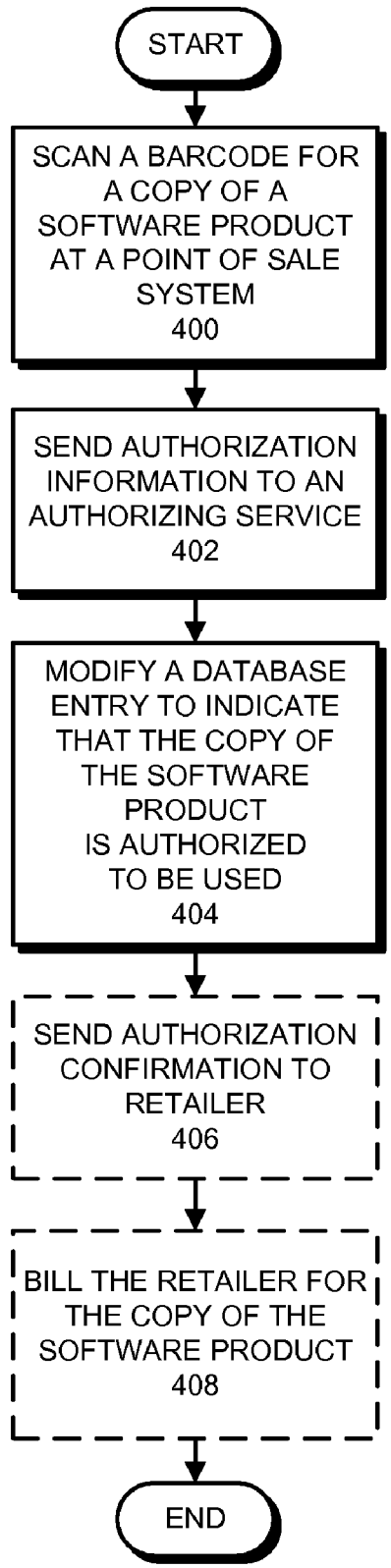
FIG. 4 presents a flowchart illustrating the process of purchasing a software product in accordance with an embodiment of the present invention.

FIG. 4 presents a flowchart illustrating the process of purchasing a software product in accordance with an embodiment of the present invention. The process begins when cashier 312 scans a barcode associated with a copy of software product 390 using point of sale system 310 (step 400). Scanning the barcode enables point of sale system 310 to obtain authorization information associated with the copy of software product 390. This authorization information can include the product name, a serial number (which is typically a unique serial number), and a version identifier which identifies the version of the copy of software product 390, wherein different versions include different levels of functionality. Point of sale system 310 can obtain additional authorization information from a computer system (not shown) associated with retailer 314 and from information that customer 322 provides to cashier 312 who subsequently provides the information to point of sale system 310 via an input device (not shown). This additional authorization information can include: retailer 314's name; retailer 314's location identifier; a copy of software product 390's sale price (the price at which retailer 322 is selling the copy of software product 390 to customer 322); a copy of computer software 390's purchase price (the price at which retailer 322 bought the copy of software product 390); customer 322's name; and customer 322's contact information. In one embodiment of the present invention, the copy of software product 390 is a complete version of a software product, but retailer 314 can sell the copy of software product 390 with different levels of functionality depending on the price customer 322 is willing to pay for a copy of software product 390. In this embodiment, authorization information can include the version of the software product that customer 322 is purchasing; or other information relevant to the purchase and licensing of a software product.

In one embodiment of the present invention, copy of software product 390 includes volume, consumptive, or site licenses.

In one embodiment of the present invention, point of sale system 310 includes an RFID reader that obtains authorization information from an RFID embedded in the copy of software product 390.

In one embodiment of the present invention, cashier 312 uses an input device such as a keyboard or a digital pen to manually enter authorization information into point of sale system 310.

Point of sale system 310 then sends the authorization information to database 330 which authorizing service 334 owns (step 402). Note that authorizing service 334 can be the original equipment manufacturer of the copy of software product 390, a third-party, or retailer 314 or an organization associated with retailer 314.

In one embodiment of the present invention, point of sale system 310 sends the authorization information to server 340 which third-party 344 owns. In this embodiment, server 340 or point of sale system 310 can send the authorization information to database 330.

Next, database 330 modifies a database entry, based on the authorization information, associated with the copy of software product 390 to indicate that the copy of software product 390 is retail authorized (step 404). Note that database 330 uses the authorization information to identify the database entry associated with the copy of software product 390.

In one embodiment of the present invention, database 330 sends an authorization confirmation to point of sale system 310 or retailer 314 (step 406). This step is optional as illustrated by the dashed lines surrounding step 406.

In one embodiment of the present invention, database 330 bills retailer 314 for the difference in the initial price, which is the price paid by retailer 314 for the copy of software product 390 prior to customer 322 purchasing the copy of software product 390 (typically the initial price is a value below the threshold value that retailer 314 uses to determine whether to use a theft deterrent device to secure the copy of software product 390) and the final price, which is the total price retailer 314 agreed to pay to the organization that sold the copy of software product 390 to retailer 314 (step 408). Note that in the case of consignment, the initial price may be zero and the organization that sold the copy of software product 390 bills retailer 314 for the purchase price of copy of software product 390 after customer 322 has purchased copy of software product 390.

Using two price points provides incentive to retailer 314 to avoid using theft deterrent devices. By not using theft deterrent devices, retailer 314 improves customer 322's shopping experience. Furthermore, retailer 314 avoids the costs associated with theft deterrent devices such as employee time spent installing and removing theft deterrent devices. This step is optional as illustrated by the dashed lines surrounding step 408.

Installing a Software Product

Figure 5:
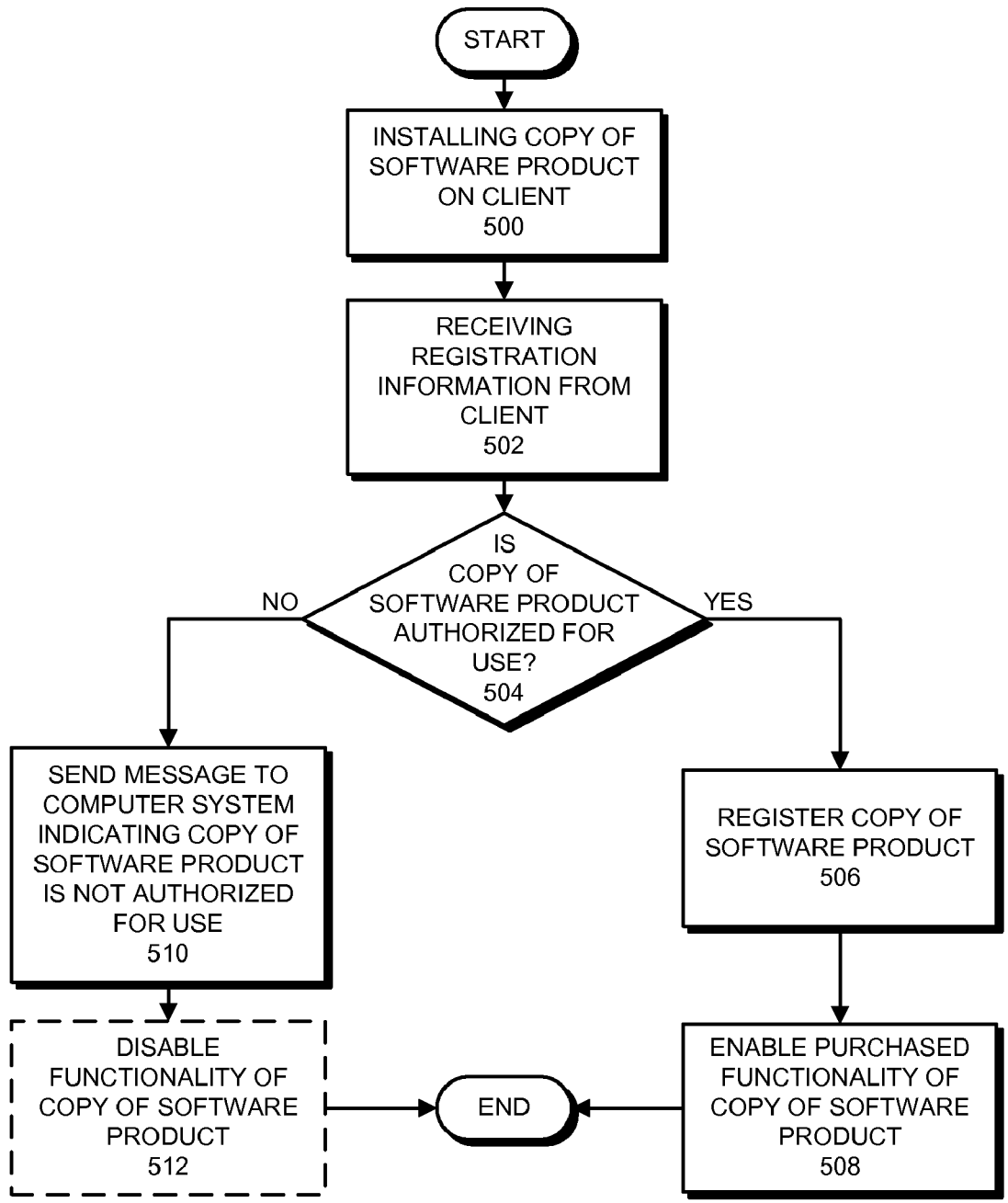
FIG. 5 presents a flowchart illustrating the process of installing a software product in accordance with an embodiment of the present invention.

FIG. 5 presents a flowchart illustrating the process of installing a software product in accordance with an embodiment of the present invention. The process begins when customer 322 installs a copy of software product 390 on client 320 (step 500). Database 330 then receives registration information from client 320 (step 502). This registration information can include a license number associated with the copy of software product 390, retailer 314's name, customer 322's name, customer 322's contact information, the name of the copy of software product 390, and the version of the copy of software product 390 that customer 322 purchased. Database 330 uses the registration information to identify the database entry associated with the copy of software product 390, and then checks if customer 322 has permission to use the copy of software product 390 (step 504). If so, database 330 registers that customer 322 owns the copy of software product 390 and has permission to use the copy of software product 390 (step 506). Database 330 then enables client 320 to execute the full functionality of the copy of software product 390 (step 508).

In one embodiment of the present invention, the process begins when customer 322 launches copy of software product 390. In this embodiment, database 330 receives verification information from client 320, which facilitates in determining if customer 322 has permission to proceed with installing, or executing copy of software product 390 on client 320. Note that "launch" can refer to launching the installation process, or launching execution of copy of software product 390.

In one embodiment of the present invention, database 330 enables client 320 to execute the purchased functionality of the copy of software product 390. Note that the purchased functionality of the copy of software product 390 may not be the full potential functionality of the copy of software product 390. This embodiment enables an organization to sell different versions of a software product on a single set of non-volatile storage media without the problem that a user who purchased a cheaper version of the software product will have access to a pricier version of the software product without paying for an upgrade.

In one embodiment of the present invention, database 330 verifies that customer 322 has permission to use the copy of software product 390 each time customer 322 attempts to use the copy of software product 390.

In one embodiment of the present invention, database 330 ensures that the number of customers using the copy of software product 390 at any given time does not exceed the number of licenses customer 322 purchased for the copy of software product 390.

In one embodiment of the present invention, database 330 ensures that customer 322 is installing the software product on a client located at a site specified by a site license.

In one embodiment of the present invention, database 330 ensures that customer 322 does not exceed the number of transactions included in a consumptive or transaction-based license.

In one embodiment of the present invention, enabling client 320 to execute the copy of software product 390 can include providing a key to unlock the copy of software product 390, decrypting the copy of software product 390, and any other method for enabling client 320 to execute the copy of software product 390 known to those familiar in the art.

If database 330 determines that customer 322 does not have permission to use the copy of software product 390, database 330 sends a message to client 320 indicating that customer 322 does not have permission to use the copy of software product 390 and that customer 322 should contact the organization that manufactures the copy of software product 390 for further assistance (step 510). Database 330 then disables the functionality of the copy of software product 390 on client 320 (step 512). This step is optional as illustrated by the dashed lines surrounding step 512.

In one embodiment of the present invention, customer 322 calls a registration agent (not shown) who works for authorizing service 334 to provide registration information to database 330. In this embodiment, the registration agent checks database 330 to determine whether customer 322 has permission to use the copy of software product 390.

In one embodiment of the present invention, database 330 receives verification information, which facilitates in determining if customer 322 has permission to install copy of software product 390 on client 320. In this embodiment, registration information determines if customer 322 has permission to use copy of software product 390, but does not prevent installation of copy of software product 390.

Deactivating a Software Product

Figure 6:
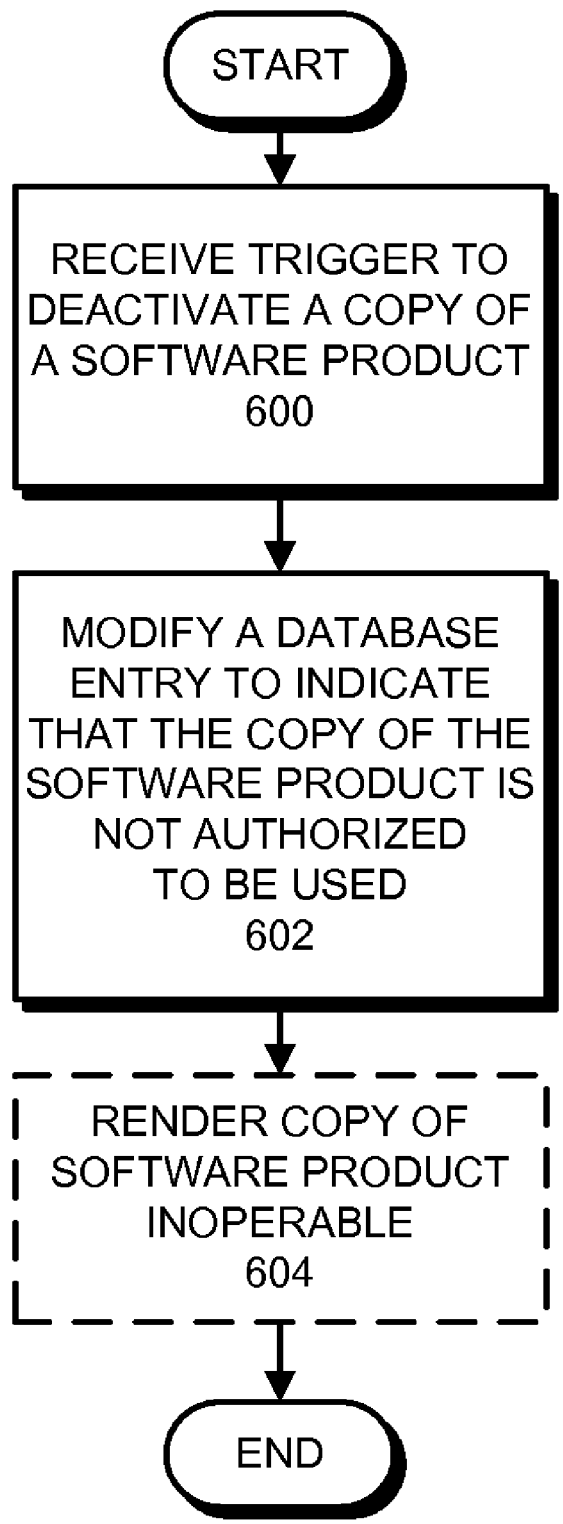
FIG. 6 presents a flowchart illustrating the process of deactivating a software product in accordance with an embodiment of the present invention.

FIG. 6 presents a flowchart illustrating the process of deactivating a software product in accordance with an embodiment of the present invention. The process begins when database 330 receives a trigger to deactivate a copy of software product 390 (step 600).

In one embodiment of the present invention, the trigger to deactivate the copy of software product 390 is an expiration time. This helps facilitate trial or grace periods of software products and for software products sold under a licensing scheme that enables the use of the software product for a limited time period. Note that a trial or grace period may or may not include the full functionality of copy of software product 390.

In one embodiment of the present invention, upon scanning the copy of software product 390, a point of sale system sends a trigger to database 330 to deactivate the copy of software product 390. This trigger includes deactivation information, which can include: a serial number associated with the copy of software product 390, retailer 314's name, retailer 314's location identifier, customer 322's name, and customer 322's contact information.

In one embodiment of the present invention, the point of sale system sending the trigger to database 330 to deactivate the copy of software product 390 is point of sale system 310.

Next, database 330 modifies a database entry associated with the copy of software product 390 to indicate that the copy of software product 390 is not authorized for use (step 602). Typically, retailers do not accept returns on opened boxes of software products for fear of contributing to copyright infringement. Using this invention, retailer 314 can accept returns, thus increasing customer satisfaction, without the fear of contributing to copyright infringement.

In one embodiment of the present invention, database 330 renders the copy of software product 390 inoperable at client 320 (step 604). This step is optional as illustrated by the dashed lines surrounding step 604.

Using Retail Authorization to Reduce a Software Product's Initial Value

In one embodiment of the present invention, retail authorization is used to reduce the initial value of a software product. Because the retail authorization process allows a software vendor to provide "dead" (until activated) products for sale that only become functional when properly purchased, the software vendor can dramatically reduce the initial cost charged to a retailer offering the software product (sometimes referred to as the "sell-in cost"). For instance, the software vendor may initially bill the retailer for a very low initial cost that covers the material cost (e.g., manufacturing and shipment) of the software product. The retailer then pays the remaining wholesale cost of the software product (e.g., the difference between the wholesale price and the sell-in price) after the software product is actually purchased and activated. Note that in this example any products lost to theft prior to activation result in the loss of the reduced initial cost, as opposed to the loss of the full wholesale cost for the software product.

In some retail environments, employees are graded based on factors such as sales and product "shrink" (e.g., the theft/loss rate for products). For instance, managers may be held accountable for all of the products stolen from a retail location, or even for products lost in-transit to a retail location. Retail activation can potentially reduce loss both in-transit to and in the retail location. Displaying reduced-value products prior to retail authorization reduces the return for thieves hoping to sell stolen software products in the black or grey markets. While some product theft may still occur, losses are limited to the lower (e.g., material) costs, and moreover, because stolen copies cannot be used, legitimate demand will not be reduced by the distribution of such un-activatable stolen copies.

Figure 7:
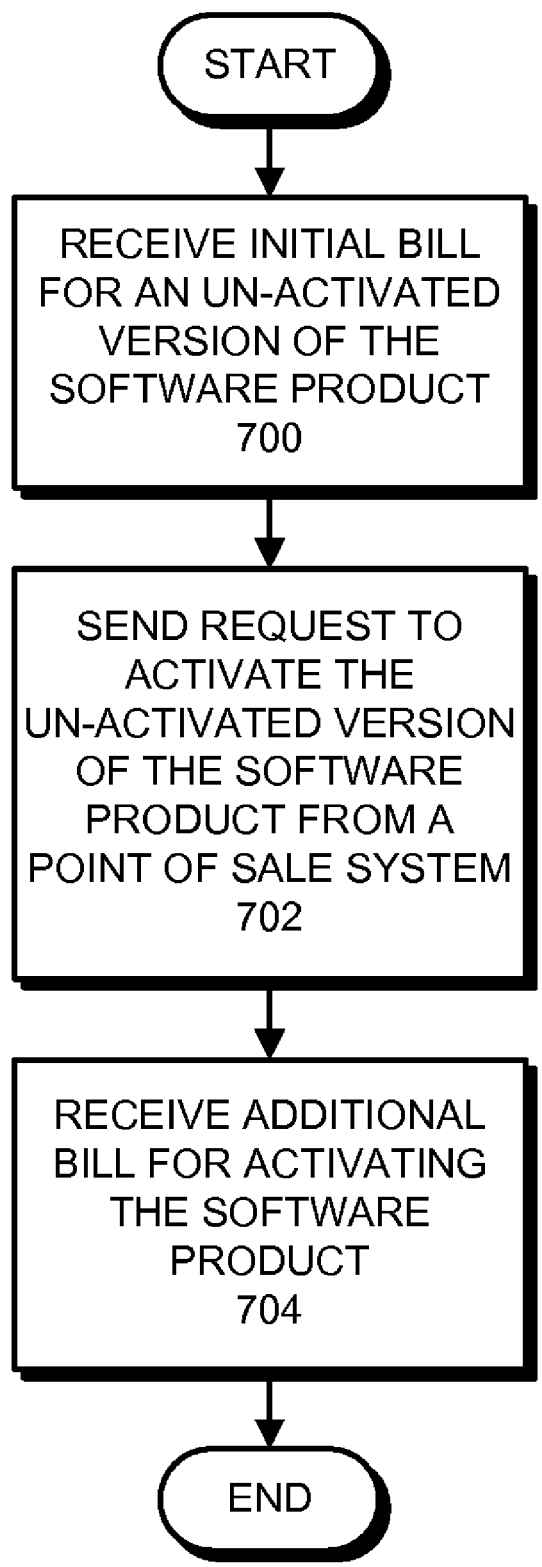
FIG. 7 presents a flowchart illustrating the process of using retail authorization to reduce a software product's initial value in accordance with an embodiment of the present invention.

FIG. 7 presents a flowchart illustrating the process of using retail authorization to reduce a software product's initial value. During operation, the system receives an initial bill for an un-activated version of the software product (operation 700). This un-activated version of the software product is not fully functional, and therefore has a lower value than a functional version of the software product. The initial bill is for an initial cost that is associated with this lower value. Later, for instance at the time of sale, the system sends a request to activate the un-activated version of the software product from a point of sale system (operation 702). After sending this request, or at some point after this request has been sent, the system receives an additional bill for activating the software product (operation 704).

In one embodiment of the present invention, reducing the initial cost that a retailer pays to a software vendor can greatly reduce the retailer's inventory cost, thereby improving retailer return on inventory. A considerable percentage of a retailer's assets are often tied up in keeping an inventory of products available on-hand for customer examination and purchase, and the retailer often pays for this product inventory whether the product ends up being sold or not. A reduced inventory cost facilitated by cheaper, un-activated software products can reduce barriers to entry for a new retailer, as well as lowering the potential risk for a retailer seeking to introduce new software products.

The revenue produced per dollar of inventory is a common performance metric for retailers, and if sales for a software product stay constant, reducing the cost of inventory can dramatically improve such metrics for a retailer. For instance, if a retailer typically holds 10 copies of a software product that sells for $150 at a rate of 1 per day, and has a wholesale (or "sell-in") cost of $100, the gross-margin-to-cost equation is 1500/1000, or 1.5. If the described technique is used, and the initial sell-in cost is reduced to $10, this metric goes up to 1500/100, or 15.

In one embodiment of the present invention, determining the sell-in cost for the software product involves choosing a cost that encourages the retailer to stock and display the un-activated version of the software product, but also gives the retailer an incentive not to lose the un-activated version. For instance, a software vendor may seek to reduce the initial cost for a software product to encourage the retailer to display the software product with minimal restrictions (e.g. not lock up the product in a locked display case, or use spiderwrap), and thereby potentially increase the number of sales. However, at the same time, the software vendor may not want to risk reducing the sell-in cost to the point where a retailer is no longer as conscientious in taking care of or monitoring the product because of the low initial value. Hence, the system may dynamically tune this cost based on a set of product- and retailer-related characteristics to find a reasonable balance between these two concerns.

In one embodiment of the present invention, the system may set the sell-in cost charged to the retailer to zero. This scenario is sometimes advantageous, for instance when a software vendor would like to provide a strong incentive to a retailer to carry a new product. In this scenario, the software vendor may bear the material cost for any its products stolen from the retailer. However, these potential costs may be an acceptable trade-off in exchange for achieving an initial retail presence. In this scenario, the software vendor can subsequently bill the retailer for the full wholesale cost of the software product when or after the un-activated version is activated from the point of sale. In such a "consignment model," shrink can be computed periodically based on the number of products shipped to a retailer, sold by the retailer, returned from the retailer, and remaining at the retailer.

In one embodiment of the present invention, the sell-in cost and/or the additional bill can include one-time set-up fees, as well as ongoing maintenance fees. For instance, the set-up fees can include a one-time fee to reflect the cost of setting up the retail authorization system or adding a software product to the retail authorization system. Recurring costs can include charges related to: technical issue management; transaction fees; communications expenses; customer service support; offline authorization costs; in-store maintenance costs; and intellectual property and/or licensing costs.

In summary, retail authorization can be used to reduce the initial value of a software product, thereby reducing retailer inventory costs and reducing shrink. Such techniques can be beneficial for both software vendors and retailers, by reducing the incentive for theft of software products and increasing sales.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method executed by a computer system that includes a memory and processor for using retail authorization to reduce the initial value of a software product, comprising, in the processor:

receiving in the computer system an initial bill for an un-activated version of the software product, wherein a physical representation of the un-activated version of the software product is displayed for sale publicly at a retailer, wherein the un-activated version of the software product is not fully functional, and thereby has a lower value than a functional version of the software product;

wherein the initial bill is for an initial cost associated with the lower value of the un-activated version;

in conjunction with the sale of the physical representation of the un-activated version of the software product, sending from the computer system a request to activate the un-activated version of the software product from a point of sale system at the retailer; and receiving in the computer system an additional bill for activating the software product;

wherein displaying the un-activated, lower-value version of the software product facilitates publicly displaying the software product while reducing the risk of theft for the software product.

2. The method of claim 1, wherein the lower value and associated initial cost for the un-activated version reduces retailer inventory costs and the likelihood of theft for the software product.

3. The method of claim 2, wherein the un-activated version of the software product is displayed at the retail location.

4. The method of claim 3, wherein the method further involves:

determining the initial cost; and wherein determining the initial cost involves choosing a cost that encourages the retailer to stock and display the un-activated version while giving the retailer an incentive not to lose the un-activated version.

5. The method of claim 4, wherein the initial cost corresponds to a material cost for the software product.

6. The method of claim 5, wherein the additional bill charges for the difference between a wholesale cost and the initial cost for the software product.

7. The method of claim 4, wherein the initial cost is zero; and wherein the additional bill is for the full wholesale cost of the software product.

8. The method of claim 1, wherein the initial cost and/or the additional bill include a set-up fee and/or an ongoing maintenance fee.

9. A method executed by a computer system that includes a memory and processor for using retail authorization to reduce the initial value of a software product, comprising, in the processor:

sending from the computer system to a retailer an initial bill for the un-activated version of the software product, wherein a physical representation of the un-activated version of the software product is displayed for sale publicly at the retailer, wherein the un-activated version of the software product is not fully functional, and thereby has a lower value than a functional version of the software product;

wherein the initial bill is for an initial cost associated with the lower value of the un-activated version;

receiving in the computer system a request to activate the un-activated version of the software product from a point of sale system in conjunction with the sale of the physical representation of the un-activated version of the software product by the retailer;

activating the un-activated version of the software product using the computer system; and sending from the computer system to the retailer an additional bill for activating the software product;

wherein displaying the un-activated, lower-value version of the software product facilitates publicly displaying the software product while reducing the risk of theft for the software product.

10. A computer-readable storage medium storing instructions that when executed by a computer cause the computer to perform a method for using retail authorization to reduce the initial value of a software product, the method comprising:

receiving in the computer an initial bill for an un-activated version of the software product, wherein a physical representation of the un-activated version of the software product is displayed for sale publicly at a retailer, wherein the un-activated version of the software product is not fUlly fUnctional, and thereby has a lower value than a functional version of the software product;

wherein the initial bill is for an initial cost associated with the lower value of the un-activated version;

in conjunction with the sale of the physical representation of the un-activated version of the software product, sending from the computer a request to activate the un-activated version of the software product at a point of sale system at the retailer; and receiving in the computer an additional bill for activating the software product;

wherein displaying the un-activated, lower-value version of the software product facilitates publicly displaying the software product while reducing the risk of theft for the software product.

11. The computer-readable storage medium of claim 10, wherein the lower value and associated initial cost for the un-activated version reduces retailer inventory costs and the likelihood of theft for the software product.

12. The computer-readable storage medium of claim 11, wherein the un-activated version of the software product is displayed at the retail location.

13. The computer-readable storage medium of claim 12, wherein the method further involves:

determining the initial cost; and wherein determining the initial cost involves choosing a cost that encourages the retailer to stock and display the un-activated version while giving the retailer an incentive not to lose the un-activated version.

14. The computer-readable storage medium of claim 13, wherein the initial cost corresponds to a material cost for the software product.

15. The computer-readable storage medium of claim 14, wherein the additional bill charges for the difference between a wholesale cost and the initial cost for the software product.

16. The computer-readable storage medium of claim 13, wherein the initial cost is zero; and wherein the additional bill is for the wholesale cost of the software product.

17. A computer-readable storage medium storing instructions that when executed by a computer cause the computer to perform a method for using retail authorization to reduce the initial value of a software product, the method comprising:

sending from the computer to a retailer an initial bill for the un-activated version of the software product, wherein a physical representation of the un-activated version of the software product is displayed for sale publicly at the retailer, wherein the un-activated version of the software product is not fully functional, and thereby has a lower value than a functional version of the software product;

wherein the initial bill is for an initial cost associated with the lower value of the un-activated version;

receiving in the computer a request to activate the un-activated version of the software product from a point of sale system in conjunction with the sale of the physical representation of the un-activated version of the software product by the retailer;

activating the un-activated version of the software product using the computer; and sending from the computer to the retailer an additional bill for activating the software product;

wherein displaying the un-activated, lower-value version of the software product facilitates publicly displaying the software product while reducing the risk of theft for the software product.

18. A computer system that includes a processor that uses retail authorization to reduce the initial value of a software product, comprising:

a receiving mechanism programmed to receive an initial bill for an un-activated version of the software product, wherein a physical representation of the un-activated version of the software product is displayed for sale publicly at a retailer, wherein the un-activated version of the software product is not fully functional, and thereby has a lower value than a functional version of the software product;

wherein the initial bill is for an initial cost associated with the lower value of the un-activated version;

a sending mechanism programmed to send a request to activate the un-activated version of the software product at a point of sale system at the retailer in conjunction with the sale of the physical representation of the un-activated version of the software product;

wherein the receiving mechanism is further programmed to receive an additional bill for activating the software product; and wherein displaying the un-activated, lower-value version of the software product facilitates publicly displaying the software product while reducing the risk of theft for the software product.

19. The apparatus of claim 18, wherein the lower value and associated initial cost for the un-activated version reduces retailer inventory costs and the likelihood of theft for the software product.

20. The apparatus of claim 19, wherein the un-activated version of the software product is displayed at the retail location.

21. The apparatus of claim 20, wherein the apparatus further includes:

a determining mechanism configured to determine the initial cost; and wherein determining the initial cost involves choosing a cost that encourages the retailer to stock and display the un-activated version while giving the retailer an incentive not to lose the un-activated version.

22. The apparatus of claim 21, wherein the initial cost corresponds to a material cost for the software product.

23. The apparatus of claim 22, wherein the additional bill charges for the difference between a wholesale cost and the initial cost for the software product.

24. The apparatus of claim 21, wherein the initial cost is zero; and wherein the additional bill is for the wholesale cost of the software product.

25. A computer system that includes a processor that uses retail authorization to reduce the initial value of a software product, comprising:
- a sending mechanism programmed to send a retailer an initial bill for the un-activated version of the software product, wherein a physical representation of the un-activated version of the software product is displayed for sale publicly at a retailer, wherein the un-activated version of the software product is not fully functional, and thereby has a lower value than a functional version of the software product;
- wherein the initial bill is for an initial cost associated with the lower value of the un-activated version;
- a receiving mechanism programmed to receive a request to activate the un-activated version of the software product from a point of sale system at the retailer in conjunction with the sale of the physical representation of the un-activated version of the software product; and
- an activation mechanism programmed to activate the un-activated version of the software product
- wherein the sending mechanism is further programmed to send the retailer an additional bill for activating the software product; and
- wherein displaying the un-activated, lower-value version of the software product facilitates publicly displaying the software product while reducing the risk of theft for the software product.

* * * * *

UNITED STATES PATENT AND TRADEMARK OFFICE
CERTIFICATE OF CORRECTION

PATENT NO.       : 7,680,741 B2                                      Page 1 of 1
APPLICATION NO.  : 11/828818
DATED            : March 16, 2010
INVENTOR(S)      : Richard W. Cook et al.

It is certified that error appears in the above-identified patent and that said Letters Patent is hereby corrected as shown below:

In claim 10 (at column 13, line 20), please replace the words "fUlly fUnctional" with the words --fully functional-- so that both words have all lower-case letters.

Signed and Sealed this

Eighteenth Day of May, 2010

David J. Kappos
*Director of the United States Patent and Trademark Office*